United States Patent [19]

Carville et al.

[11] Patent Number: 4,573,488

[45] Date of Patent: Mar. 4, 1986

[54] ADDITIVES FOR NONAQUEOUS LIQUIDS

[75] Inventors: Donna B. Carville, Plaquemine; Edwin R. Feig, Baton Rouge; Gene D. Rose, Midland; Mary H. Pulliam, Baton Rouge, all of La.

[73] Assignee: The Dow Chemical Company, Midland, Mich.

[21] Appl. No.: 599,317

[22] Filed: Apr. 12, 1984

[51] Int. Cl.[4] .......................... C09K 3/00; F17D 1/16; F17D 1/18

[52] U.S. Cl. .................................. 137/13; 252/8.55 R

[58] Field of Search ..................... 252/8.5, 8.55, 52 A; 137/13, 14

[56] References Cited

U.S. PATENT DOCUMENTS

| | | | |
|---|---|---|---|
| 3,215,154 | 1/1965 | White et al. | 137/13 |
| 3,634,244 | 9/1972 | Herold et al. | 252/48.2 |
| 3,692,676 | 10/1972 | Culter et al. | 252/8.55 R |
| 4,088,583 | 5/1978 | Pyle et al. | 252/8.5 C |
| 4,431,557 | 2/1984 | Shimizu et al. | 252/52 A |

OTHER PUBLICATIONS

Bird et al., (1977), *Dynamics of Polymeric Liquids*, vol. 1, Fluid Mechanics, New York: John Wiley & Sons, Inc., pp. 112–114.

Gray et al., (1980), *Composition and Properties of Oil Well Drilling Fluids*, Fourth Edition, Houston: Gulf Publishing Co., pp. 391–395, 404–407.

*Primary Examiner*—Thomas Wallen

*Attorney, Agent, or Firm*—Douglas N. Deline; Norman L. Sims; Christopher John Rudy

[57] ABSTRACT

Homopolymers and copolymers of butylene oxide having a molecular weight of at least about 1 million are employed as drag reducing agents in nonaqueous liquids.

24 Claims, No Drawings

ADDITIVES FOR NONAQUEOUS LIQUIDS

BACKGROUND OF THE INVENTION

The present invention relates to a method of decreasing frictional loss in nonaqueous or petroleum-based liquids flowing through conduits. More particularly, it relates to an additive for such liquids that decreases frictional losses during the pumping or moving thereof.

In U.S. Pat. No. 3,692,676, the problem of friction loss or drag in the transport of liquids via a conduit or pipe is explained. In the reference, an effective drag reducing agent to reduce such friction loss in hydrocarbon liquids is taught to comprise homopolymers or copolymers of alpha-olefins having 6 to 20 carbon atoms.

In U.S. Pat. No. 3,215,154, a similar process for drag reduction of hydrocarbon liquids was disclosed that employed high molecular weight polyisobutylene.

In U.S. Pat. No. 3,634,244, alkylene polyethers including homopolymers or copolymers of butylene oxide having molecular weights from about 10,000 to about 100,000 are added to petroleum or mineral oils as viscosity index improvers.

SUMMARY OF THE INVENTION

According to the present invention, there is provided a process for reducing friction loss in nonaqueous liquids flowing through conduits comprising adding to the nonaqueous liquid an effective amount to reduce friction of a homopolymer of butylene oxide or a copolymer comprising butylene oxide and a vicinal epoxide of from about 2 to 25 carbons wherein the homopolymer or copolymer has a molecular weight of from about 1 million to about 10 million amu.

DETAILED DESCRIPTION OF THE INVENTION

The nonaqueous liquids in which the additive of the present invention is effective include petroleum hydrocarbons and other oleaginous liquids and non-hydrocarbonaceous liquids such as liquid carbon dioxide. Included are emulsions, suspensions or dispersions of such products. Examples include crude oil, refined petroleum products, e.g., gasoline, fuel oil, motor oils, asphalt, etc., water-oil emulsions and nonaqueous hydraulic fracturing fluids. In the latter case, the fluid may contain, in addition to a nonaqueous liquid, a solid particulate such as sand as a propping agent as well as inhibitors, surfactants and other materials commonly added to fracturing fluids.

The polymeric drag reducing agents of the present invention are prepared by polymerizing 1,2-butylene oxide optionally in combination with $C_{2-25}$ vicinal epoxides. The polymerization is conducted in known manner employing a suitable polymerization catalyst. Known catalysts include the double metal cyanide complexes taught, for example, in U.S. Pat. Nos. 3,278,459 or 3,427,334. Additional catalysts include the alkyl aluminums as taught by U.S. Pat. No. 2,870,100; alkyl aluminums in combination with water and optionally a beta-diketone as taught in U.S. Pat. No. 3,219,591; or alkyl aluminums in combination with secondary amines and optionally water as taught in U.S. Pat. No. 3,186,958. A particularly preferred catalyst for polymerization of butylene oxide according to the present process is an alkyl aluminum, especially triisobutyl aluminum, in combination with an organic nitrogen base compound, a beta-diketone and water according to the teachings of U.S. Pat. No. 4,376,723. A further option is to additionally employ tetrahydrofuran in the above catalyst formulation. The resultant catalyst is particularly active and selective in the preparation of high molecular weight polymers employed in the present process.

In addition to 1,2-butylene oxide, other vicinal alkylene oxides may be employed according to the present invention. Suitable vicinal alkylene oxides include ethylene oxide, 1,2-propylene oxide, 1,2-pentane oxide, and higher molecular weight alkylene oxides. In particular, $C_{10-24}$ alkylene oxides result in a polymerized product that is more readily dissolved or dispersed in hydrocarbonaceous liquids. Of the $C_{10-24}$ alkylene oxides, there may be particularly enumerated $C_{15-20}$ alkylene oxides as most desirable for use in combination with 1,2-butylene oxide in such applications.

When copolymers of butylene oxide are employed, the amount of butylene oxide incorporated into the copolymer is preferably more than about 50 percent by weight and most preferably more than about 75 percent by weight of the resulting copolymer.

The molecular weight of the homopolymer or copolymer of butylene oxide is between about 1 million amu and 10 million amu. A preferred molecular weight is from about 1.5 million amu to about 4 million amu. In calculation of the molecular weights of the polymers employed in the present process, the method employed is the measurement of intrinsic viscosity in hexane solution according to the procedure taught in U.S. Pat. No. 4,376,723.

In order to effect drag reduction, the homopolymer or copolymer is added to the nonaqueous liquid in a small but effective amount. Typically, the homopolymer or copolymer is present in an amount by weight of from about 2 ppm (parts per million) to about 10,000 ppm. Preferred amounts are from about 10 ppm to about 1,000 ppm.

SPECIFIC EMBODIMENTS

Having described the invention, the following examples are provided as further illustrative and are not to be construed as limiting.

EXAMPLE 1

A sample of polybutylene oxide is prepared substantially according to the following procedure. The catalyst is prepared in an ice bath. Accordingly, 40 ml of hexane is chilled to 0° C. in a 500 ml round-bottom flask that is purged with nitrogen and fitted with a pressure equalizing addition funnel, a thermometer, a stirrer and Claisen adapter with a parallel side arm. To the chilled hexane, phenothiazine (0.008 mole) is added with stirring followed by triisobutyl aluminum (0.030 mole). The mixture is chilled to less than about 5° C. while a solution of tetrahydrofuran (0.36 mole) in hexane is added dropwise. Finally, a combination of water (0.012 mole) and acetyl acetone (0.012 mole) in hexane is added dropwise to produce the finished catalyst.

After the catalyst is prepared, it is diluted and butylene oxide (120 g) is added directly to the catalyst solution. The reactor is heated to about 75° C. and maintained at that temperature for about 5 hours. The polymeric material obtained at completion of the reaction is a clear to light brown colored rubbery solid having a molecular weight of about $1.07 \times 10^6$ amu as measured by intrinsic viscosity. The polymer is referred to hereafter as polymer I.

Additional polymers are prepared according to the preceding technique. Accordingly, polymer II is a homopolymer of butylene oxide having molecular weight of $2.05\times10^6$ amu. Polymer III is a copolymer comprising about 67 percent by weight butylene oxide and 33 percent by weight propylene oxide and having a molecular weight of about $1.5\times10^6$ amu.

In order to test drag reduction properties of polymers according to the present invention, solutions of the polymers in crude oil (Alaskan crude) are prepared containing by weight 25 parts per million (ppm) of drag reducing polymer. Data are obtained by measuring flow rates at fixed pressure differentials in a 2.4 mm diameter capillary tube. Results are contained in Table I where the abbreviations have the following meanings: $\Delta P$=pressure differential (Pascal), Re=Reynold's number, fff=fanning friction factor. % Flow increase is calculated by $[(1/1\text{-}\%\ \text{Drag Reduction}/100)^{0.55}-1]\times100$, where % Drag Reduction is the percentage reduction in linear flow rate.

TABLE I

| Drag Reducer | ΔP | Linear Flow rate (m/sec) | Re | fff (× $10^{-3}$) | Shear Rate ($sec^{-1}$) | % Flow Increase |
|---|---|---|---|---|---|---|
| — | 68.95 | 0.58 | 59.2 | 6.18 | 1947 | |
| — | 137.9 | 1.07 | 109.0 | 3.64 | 3586 | |
| — | 206.8 | 1.4 | 146.4 | 3.03 | 4815 | |
| — | 275.8 | 1.8 | 183.8 | 2.56 | 6045 | |
| — | 344.7 | 2.1 | 211.8 | 2.41 | 6967 | |
| Polymer I | 137.9 | 1.2 | 121.5 | 2.93 | 3996 | 11.4 |
| " | 206.8 | 1.6 | 168.2 | 2.30 | 5532 | 14.9 |
| " | 275.8 | 2.2 | 221.1 | 1.77 | 7274 | 20.3 |
| " | 344.7 | 2.6 | 261.7 | 1.58 | 8606 | 23.5 |
| Polymer II | 137.9 | 1.2 | 121.5 | 2.93 | 3996 | 11.4 |
| " | 206.8 | 1.8 | 183.8 | 1.92 | 6045 | 27.2 |
| " | 275.8 | 2.3 | 236.7 | 1.55 | 7786 | 28.8 |
| " | 344.7 | 2.9 | 292.8 | 1.26 | 9631 | 38.2 |
| Polymer III | 137.9 | 1.3 | 130.9 | 2.53 | 4303 | 20.0 |
| " | 206.8 | 1.7 | 178.2 | 2.06 | 5840 | 21.3 |
| " | 275.8 | 2.2 | 226.9 | 1.68 | 7479 | 23.7 |
| " | 344.7 | 2.6 | 270.1 | 1.51 | 8811 | 26.5 |

EXAMPLE 2

Polymer II is tested in a larger capacity testing facility and compared with a commercially available drag reducing agent, Arcoflo ®. The test involves a loop of pipe 1-inch (2.54 cm) internal diameter, 400 ft (122 m) in length equipped with a Moyno pump for circulation, Venturi flow meter and pressure drop transmitters. Data is recorded at different flow rates for drag reducer levels of 10, 20 and 50 ppm. The oil temperature was maintained within the range of 50° C.-55° C. during the test. Percent drag reduction compared to crude oil lacking a drag reducer is calculated as ($\Delta P$ with drag reducer $-\Delta P$ without drag reducer)/$\Delta P$ without drag reducer×100%. Results are contained in Table II.

TABLE II

| Drag Reducer | Linear flow rate (m/sec) | % Drag Reduction (10 ppm) | (20 ppm) | (50 ppm) |
|---|---|---|---|---|
| Polymer II | 1.2 | 19.0 | 45.0 | 37.0 |
| " | 1.8 | 21.2 | 39.7 | 46.3 |
| " | 2.4 | 18.8 | 34.9 | 43.7 |
| " | 3.0 | 17.0 | 27.5 | 41.9 |
| Arcoflo ® | 1.2 | 21.4 | 46.0 | 45.1 |
| " | 1.8 | 18.5 | 42.6 | 51.5 |
| " | 2.4 | 20.8 | 35.5 | 46.3 |
| " | 3.0 | 15.9 | 26.6 | 38.0 |

It is seen by comparison of the above values that Polymer II gives equivalent drag reduction performance to that of a commercially available drag reducing agent over the flow rate and concentration range tested.

EXAMPLE 3

The effect of shear degradation on the drag reducing agent of the invention is tested by circulation of crude oil containing 20 ppm of the drag reducer in the system described in Example 2 for 50 minutes. Results are contained in Table III.

TABLE III

| Time (minutes) | % Polymer II Drag Reduction | % Arcoflo ® Drag Reduction |
|---|---|---|
| 1 | 28.9 | 33.3 |
| 5 | 20.4 | 21.7 |
| 8 | 16.5 | 17.7 |
| 10 | 15.3 | 15.8 |
| 12 | 15.1 | 14.9 |
| 20 | 11.8 | 10.5 |
| 25 | 10.2 | 9.8 |
| 30 | 9.7 | 8.4 |
| 45 | 10.7 | 4.3 |
| 50 | 10.7 | 3.6 |

It is seen by comparison of the above values that Polymer II provides improved longevity to the effects of shear degradation compared to Arcoflo ®.

What is claimed is:

1. A process for reducing the friction loss in nonaqueous liquids flowing through conduits comprising adding to the nonaqueous liquid an amount effective to reduce friction of a homopolymer of butylene oxide or a copolymer comprising butylene oxide and a $C_{2\text{-}25}$ vicinal epoxide wherein the homopolymer or copolymer has a molecular weight from about 1 million to about 10 million amu.

2. A process according to claim 1 wherein the homopolymer or copolymer has a molecular weight from about 1.5 million to about 5 million amu.

3. A process according to claim 1 wherein the nonaqueous liquid is a petroleum hydrocarbon, other oleaginous liquid or combination thereof.

4. A process according to claim 3 wherein the nonaqueous liquid is crude oil.

5. A process according to claim 3 wherein the nonaqueous liquid is a refined petroleum product.

6. A process according to claim 1 wherein the homopolymer or copolymer is present in an amount from about 10 ppm to about 10,000 ppm.

7. A process according to claim 6 wherein the homopolymer or copolymer is present from about 20 ppm to about 1,000 ppm.

8. A process according to claim 1 wherein the copolymer comprises at least about 50 percent butylene oxide.

9. A process according to claim 8 wherein the copolymer comprises at least about 75 percent butylene oxide.

10. A process according to claim 8 wherein the nonaqueous liquid is a petroleum hydrocarbon, other oleaginous liquid or combination thereof.

11. A process according to claim 10 wherein the nonaqueous liquid is crude oil.

12. A process according to claim 10 wherein the nonaqueous liquid is a refined petroleum product.

13. A process according to claim 1 comprising adding to the nonaqueous liquid an amount effective to reduce friction of a homopolymer of butylene oxide.

14. A process according to claim 13 wherein the nonaqueous liquid is a petroleum hydrocarbon, other oleaginous liquid or combination thereof.

15. A process according to claim 14 wherein the nonaqueous liquid is crude oil.

16. A process according to claim 14 wherein the nonaqueous liquid is a refined petroleum product.

17. A process according to claim 1 wherein the process provides a longevity to the effects of shear degradation measured by a decrease in percent drag reduction equivalent to the value of less than about 9 times the percent drag reduction found one minute after addition of the homopolymer or copolymer compared to the percent drag reduction found at about 50 minutes of circulation as otherwise would be characteristically found in a loop of 1-inch internal diameter pipe 400 feet in length equipped with a Moyno pump for circulation, Venturi flow meter and pressure drop transmitters at a temperature of from about 50° C. to about 55° C. and a linear flow rate of from about 1.2 m/sec to about 3.0 m/sec at a concentration of 20 ppm.

18. A process according to claim 17 wherein the nonaqueous liquid is crude oil.

19. A process according to claim 18 wherein the crude oil is a crude oil substantially equivalent to Alaskan crude oil.

20. A process according to claim 19 comprising adding to the crude oil an amount effective to reduce friction of a homopolymer of butylene oxide.

21. A process according to claim 17 wherein the decrease in percent drag reduction is equivalent to a value of about 3 times or less.

22. A process according to claim 21 wherein the nonaqueous liquid is crude oil.

23. A process according to claim 22 wherein the crude oil is a crude oil substantially equivalent to Alaskan crude oil.

24. A process according to claim 23 comprising adding to the crude oil an amount effective to reduce friction of a homopolymer of butylene oxide.

* * * * *